Oct. 6, 1970
V. LARSSON ETAL
3,532,933
MEANS FOR BATTERY OF CONDENSERS
Filed Feb. 29, 1968
5 Sheets-Sheet 2
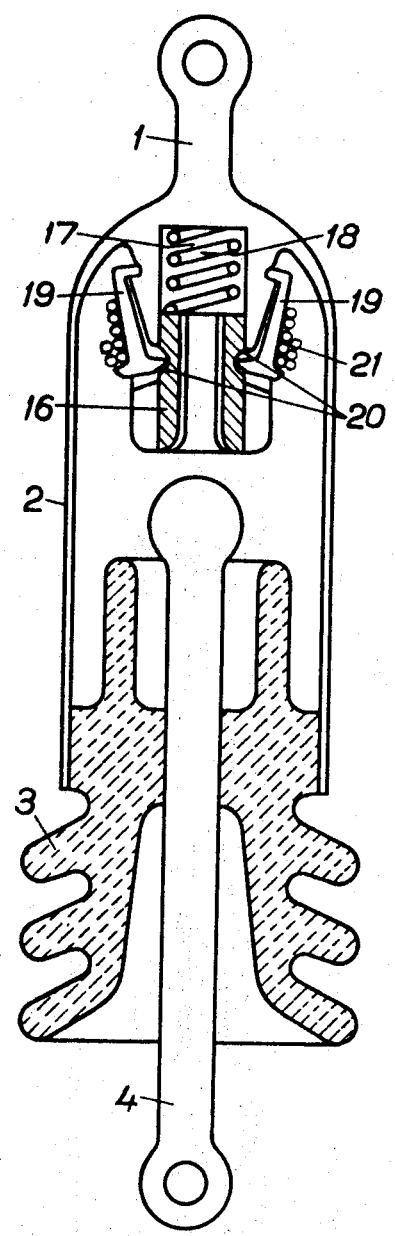
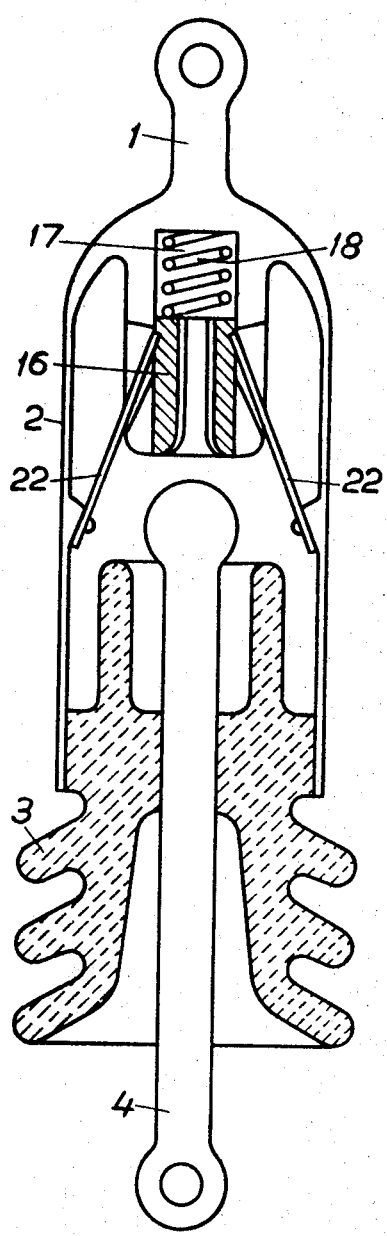
INVENTOR.
VALTER LARSSON
THOR ERIK THORSTEINSEN
BY
Jennings Bailey Jr

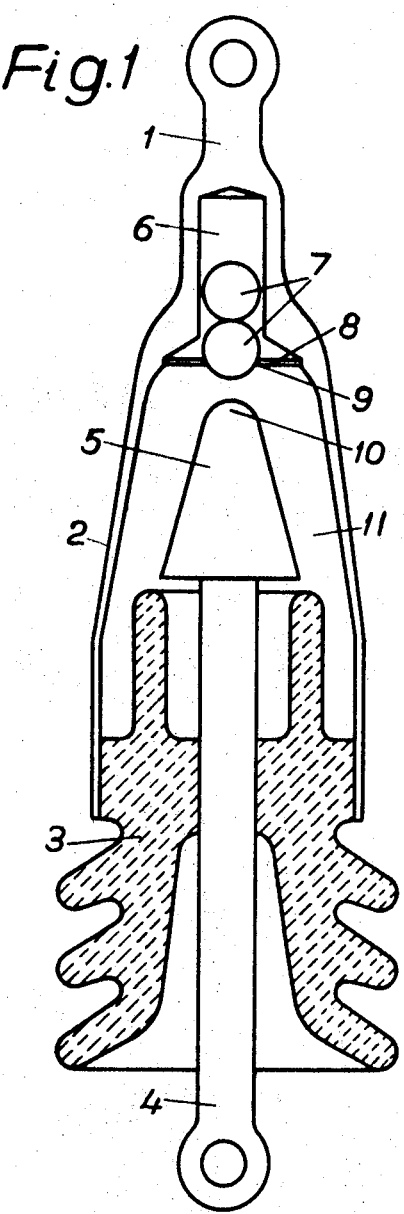
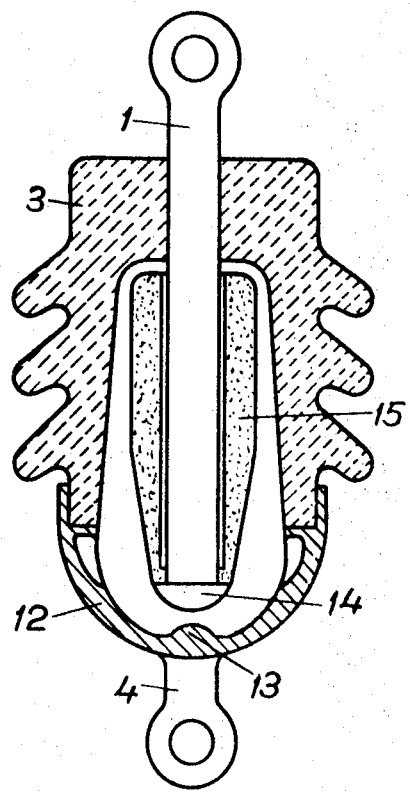

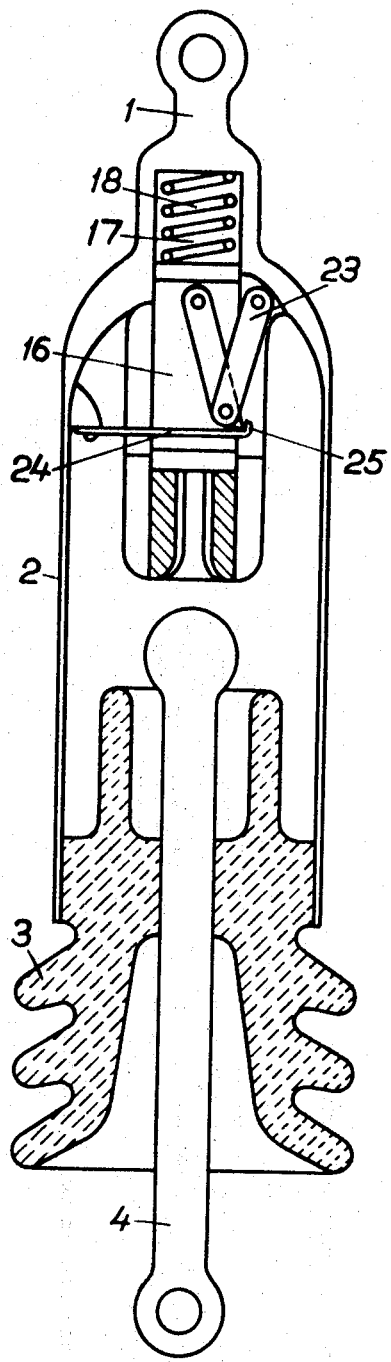
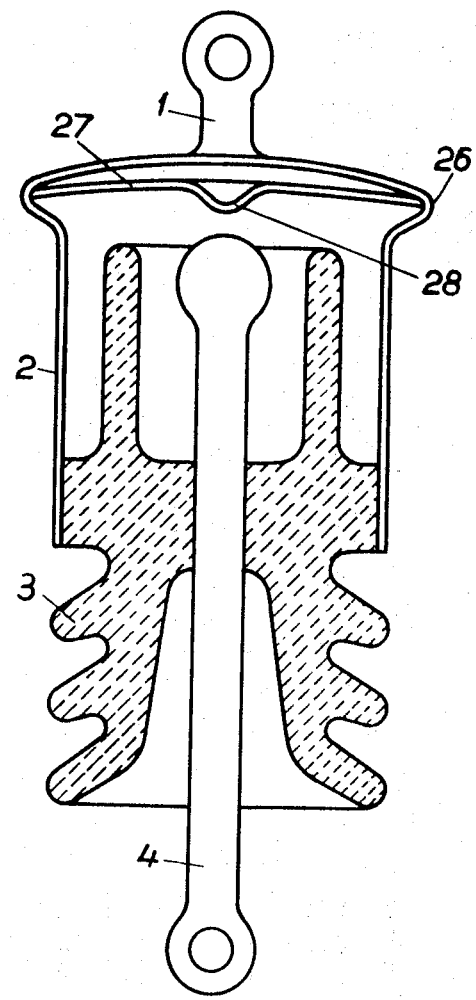

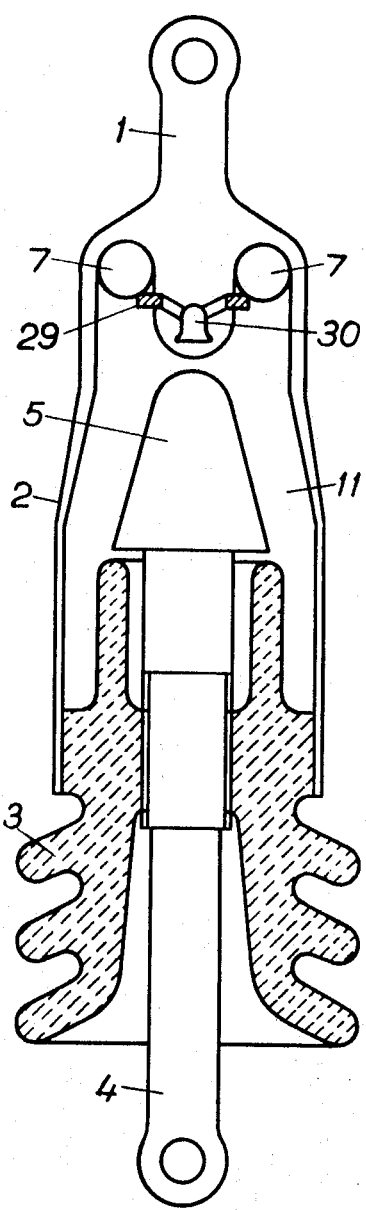

Oct. 6, 1970     V. LARSSON ETAL     3,532,933

MEANS FOR BATTERY OF CONDENSERS

Filed Feb. 29, 1968     5 Sheets-Sheet 5

INVENTOR.
VALTER LARSSON
THOR ERIK THORSTEINSEN
BY

United States Patent Office 3,532,933
Patented Oct. 6, 1970

3,532,933
MEANS FOR BATTERY OF CONDENSERS
Valter Larsson and Thor Erik Thorsteinsen, Ludvika, Sweden, assignors to Allmanna Svenska Elektriska Aktiebolaget, Vasteras, Sweden, a corporation of Sweden
Filed Feb. 29, 1968, Ser. No. 709,339
Claims priority, application Sweden, Mar. 3, 1967, 2,999/67
Int. Cl. H02h 7/16
U.S. Cl. 317—12　　　　　　　　　　　　　　4 Claims

ABSTRACT OF THE DISCLOSURE

The invention relates to a means for protecting batteries of condensers consisting of a number of series-connected capacitor units; each of the units is connected in parallel with a short-circuiting spark gap arranged to be short-circuited by the arm arising in the spark gap when the voltage is too high across the particular condenser unit, so that the faulty unit is bypassed.

BACKGROUND OF THE INVENTION

Field of the invention

The present invention relates to a means for batteries of condensers consisting of a number of series-connected capacitor units. The invention is characterised in that each of said units is parallel-connected with a short-circuiting spark gap arranged to be short-circuited by the arc arising in the spark gap when the voltage is too high over the unit so that the faulty unit is by-passed.

The prior art

Batteries of condensers for high voltages are used in alternating current networks to compensate phase displacement. In networks for high voltage direct current, harmonic filters are used to prevent the harmonics from the rectifiers from going out especially on the AC lines where they might give rise to disturbances in telecommunications and the like in the vicinity of the lines. These filters comprise, among other things, a battery of condensers.

Particularly in the latter case it is necessary that the battery of condensers should not be put out of action if a fault should arise in one of the units. Since high voltages are involved, a battery consists of several series-connected capacitor units where each unit may consist of several parallel-connected capacitor elements so that sufficient capacitance is obtained in the battery. Each such capacitor element is series-connected with a fuse which blows if the current through the capacitor becomes too great, for example due to inner short-circuiting. If each of the series-connected units contains only a few capacitor elements, for example two or three, and one of these elements is disconnected due to an internal fault, the current through the others will be so great that their fuses will also blow. This means that the entire network voltage will be imposed on the faulty element which causes complete destruction of the element due to explosion of the capacitors.

SUMMARY OF THE INVENTION

The present invention proposed that each of the series-connected units be parallel-connected with a short-circuiting spark gap having an ignition voltage which is only slightly higher than the operating voltage of the unit. If one of the capacitor elements in a unit is disconnected and the voltage across the whole unit increases to the ignition voltage of the spark gap, this is ignited and short circuits, that is disconnects the entire unit, which would otherwise be completely destroyed and thus also cause considerable damage to adjacent capacitors.

After disconnection of the faulty unit, of course, the entire network voltage will be distributed over the healthy units so that each of these receives a somewhat higher voltage than normal. However, the number of units is usually so great than this is acceptable. The battery of condensers can thus function satisfactorily until it can be disconnected at a suitable opportunity and the faulty unit replaced.

BRIEF DESCRIPTION OF THE DRAWINGS

FIGS. 1–7 of the accompanying drawings show alternative embodiments of the spark gap used for the invention.

DESCRIPTION OF THE PREFERRED EMBODIMENTS

Figure 8:
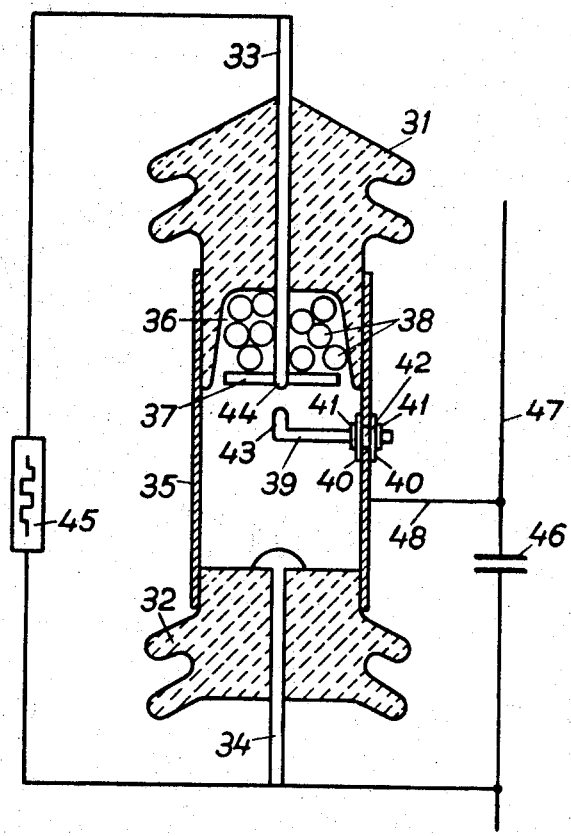
FIG. 8 shows a device for controlling and limiting the arc at ignition.

The spark gap according to FIG. 1 has an upper connecting device 1, which has a cap 2 reaching downwardly and attached at its lower end to an insulator 3. A lower connecting device 4 is attached through the insulator and finishes in a conical point 5. In the upper connecting device is a cylinder 6 and in this is a number of metal balls 7. These balls are held in place by a washer 8 of easily fusible material. The washer is provided with a central hole 9 so that the lowermost ball is partly below the washer and forms the upper electrode at the sparking distance. The other electrode is formed by the rounded top 10 of the conical point 5. The point 5 and cap 2 are so designed that an annular chamber 11 is formed around the lower part of the point 5, which is smaller in cross section than the diameter of the balls 7.

If a fault arises in the protected capacitor unit so that the voltage across the spark gap 9–10 exceeds its ignition voltage, an arc arises. The heat from this fuses the washer 8 and the balls 7 fall down into the space 11 and effect a permanent short-circuit between the parts 1 and 4 so that the faulty capacitor unit is by-passed.

In the spark gap according to FIG. 2 the upper connecting device 1 is passed through and attached to the insulator 3. The lower connecting device 4 supports a metal cap 12 which is attached by its upper edge to the lower part of the insulator. The cap 12 is internally provided with a raised part 13 which forms the lower electrode of the discharge path. The upper electrode is formed by a washer 14 arranged on the lower end of the upper connecting device, said washer being convex downwardly and functioning as support for the short-circuiting device, which in this case consists of a body 15 of easily fusible material arranged around the upper connecting device 1.

When an arc arises between the electrodes 13 and 14 the washer 14 is heated and in turn heats the body 15 so that it starts to fuse. The molten material runs down in the cap 12 and short-circuits the discharge path.

In the embodiment shown in FIG. 3 the upper connecting device 1 with the cap 2 is attached to the insulator 3. At the upper end of the lower connecting device 4 is a ball forming the lower electrode of the discharge path. The upper electrode 16 is displaceably arranged in a cylindrical recess 17 and influenced in downwards direction by a spring 18. The electrode is held in position by a pair of hooks 19 which engage in notches 20 on the electrode. The hooks 19 are maintained in engagement in the notches 20 with the help of a string 21 of inflammable material which is wound round the hooks and electrode a number of turns and which also has some part in the vicinity of the discharge path.

When the arc is ignited in the spark gap the string 21 is also ignited and burns rapidly so that the hooks release their grip and the movable electrode falls down to the lower electrode and effects a short-circuit.

The modification of the invention shown in FIG. 4 shows the electrode 16 locked by a number of bimetal springs 22 arranged in the vicinity of the discharge path so that they are influenced by the arc. When an arc arises the bimetal springs are bent outwards so that the electrode 16 falls down and short-circuits the discharge path.

FIG. 5 shows a modification of the spark gap according to FIG. 4. The upper electrode 16 is joined to the cap 2 by means of a link system 23. A bimetal 24 influenced by the arc, together with a hook 25, grips around the link system and locks the upper electrode in its upper position. When the bimetal is heated by the arc, it bends so that the hook 25 releases its grip on the electrode 16 which is then freed and short-circuits the spark gap.

FIG. 6 shows another variation where the cap 2 joined to the upper connecting device is shaped at its upper edge with a part 26 having greater diameter. A lid 27 of bimetal is inserted in this extension. The lid is provided with a depression 28 acting as the upper electrode. The lid is so shaped and clamped that when heated it suddenly snaps over downwardly so that the depression 28 comes into contact with the ball on the lower connecting device and thus short-circuits the spark gap.

FIG. 7 shows a variation of the spark gap according to FIG. 1. The balls 7 situated in the upper part of the cap 2 are kept in position by a washer 29 which at the centre has an explosive charge 30 in the vicinity of the discharge path. When the arc is ignited, the explosive charge is ignited and explodes the washer so that the balls are released and fall down into the space 11 to short-circuit the spark gap. This spark gap operates extremely rapidly.

FIG. 8 shows a spark gap provided with means for controlling and limiting the arc at ignition. The spark gap has an upper and a lower insulator 31 and 32, respectively. The upper insulator supports an upper electrode 33 and the lower insulator has a lower electrode 34. The two insulators are joined by means of a tube 35 which is suitably of electrically conducting material. The upper insulator has at its lower part a hollow space 36 which is substantially sealed at the bottom by a washer 37 of easily fusible material. The hollow space above the washer is filled with balls 38 of electrically conducting material. An intermediate electrode 39 is attached in the wall of the tube 35. The intermediate electrode is passed through a hole 42 in the wall of the tube and, to enable adjustment of the position of the electrode in relation to the upper electrode the hole stretches in vertical direction. The electrode is threaded and on each side of the tube wall it is provided with a washer 40 and a nut 41. The washers are so big that they cover the hole even when the electrode is in an outer position. Since the electrode is threaded it is also adjustable in a radial direction in the tube. The end 43 of the electrode which is in the tube is bent at an angle up towards the lower end 44 of the upper electrode. A damping resistor 45 is connected between the upper and the lower electrodes.

The capacitor to be protected is designated 46 and is connected in a line 47. On one side of the capacitor the line 47 is connected to the tube 35 and thus also to the intermediate electrode 39 by means of a conductor 48. The line is connected on the other side of the capacitor to the lower electrode 34.

If the capacitor 46 is disconnected due to its fuse blowing upon the occurrence of an internal fault in the capacitor, an arc will arise between the electrode ends 43 and 44. The current thus arising is prevented by the resistor 45 from immediately reaching its maximum value and thus prevents an immediate short-circuit in the capacitor. However, it is most important because the resistor prevents a sudden short-circuit of healthy capacitors which are connected in parallel with the disconnected faulty capacitor.

The washer 37 fuses due to the heat from the arc between the electrodes 33 and 39 and the balls 38 fall down to effect a short-circuit between the tube 35 and the upper part of the electrode 34.

What is claimed is:

1. For use in a capacitor bank comprising a plurality of series-connected capacitor units, a protective device adapted to be parallel-connected with a capacitor unit, said device comprising a short-circuiting spark gap and means responsive to an arc arising in the spark gap upon a fault in a unit to short-circuit the faulty unit, whereby said unit is bypassed, said spark gap having outer and inner electrodes spaced apart to form a short-circuiting chamber between said electrodes, said short-circuiting means comprising a plurality of metal balls, a washer having a low fusing point, holding said balls in a position higher than and out of said short-circuiting chamber, said washer being located in the vicinity of the spark-over area in the spark gap, said balls being free to fall into the short-circuiting chamber and connect said outer and inner electrodes when the washer melts from the heat of the arc.

2. A device as claimed in claim 1, in which one of the balls is normally in electrical connection with the outer electrode and forms the sparking surface thereof.

3. For use in a capacitor bank comprising a plurality of series-connected capacitor units, a protective device adapted to be parallel-connected with a capacitor unit, said device comprising a short-circuiting spark gap and means responsive to an arc arising in the spark gap upon a fault in a unit to short-circuit the faulty unit, whereby said unit is bypassed, said spark gap having outer and inner electrodes spaced apart to form a short-circuiting chamber between said electrodes, said short-circuiting means comprising a plurality of metal balls, a plate holding said balls in a position above and out of said short-circuiting chamber, a temperature-responsive explosive charge located in the vicinity of the spark-over area in the spark gap holding said plate in position, said balls being free to fall into the short-circuiting chamber and connect said outer and inner electrodes when the charge explodes and releases the plate.

4. In a capacitor bank comprising a plurality of series-connected capacitor units, a protective device comprising a spark gap having first and second main electrodes and a third intermediate electrode, means connecting said main electrodes with each other, a resistor in said connecting means, means connecting a capacitor unit between said second main electrode and said intermediate electrode, said first main electrode and said intermediate electrode being spaced apart to provide a spark gap therebetween, said device having means responsive to an arc arising in the spark gap upon a fault in the said capacitor unit to short-circuit said unit, whereby said unit is bypassed, a short-circuiting chamber within said intermediate electrode, said second main electrode having a portion in the bottom part of said short-circuiting chamber, said short-circuiting means comprising a plurality of metal balls, a washer having a low fusing point holding said balls in a position above and out of said short-circuiting chamber, said washer being located in the vicinity of the spark-over area in the spark gap, said balls being free to fall into the short-circuiting chamber and connect said second main electrode and said intermediate electrode when the washer melts from the heat in the arc.

References Cited

UNITED STATES PATENTS

| | | | |
|---|---|---|---|
| 2,418,017 | 3/1947 | Ellicock | 317—12.1 |
| 2,918,550 | 12/1959 | Tedesco | 337—16 |
| 3,179,770 | 4/1965 | Demaret | 337—18 |
| 1,382,795 | 5/1921 | McNeill | 317—66 |

J D MILLER, Primary Examiner

H. FENDELMAN, Assistant Examiner

U.S. Cl. X.R.

317—66; 337—28, 34